(12) United States Patent
Reiffenrath et al.

(10) Patent No.: US 7,744,968 B2
(45) Date of Patent: Jun. 29, 2010

(54) CYCLOBUTANE AND SPIRO[3.3]HEPTANE COMPOUNDS

(75) Inventors: Volker Reiffenrath, Roβdorf (DE); Matthias Bremer, Darmstadt (DE); Melanie Klasen-Memmer, Heuchelheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 12/067,220

(22) PCT Filed: Aug. 16, 2006

(86) PCT No.: PCT/EP2006/008050

§ 371 (c)(1), (2), (4) Date: Mar. 18, 2008

(87) PCT Pub. No.: WO2007/033732

PCT Pub. Date: Mar. 29, 2007

(65) Prior Publication Data

US 2008/0206490 A1    Aug. 28, 2008

(30) Foreign Application Priority Data

Sep. 19, 2005  (DE) .................. 10 2005 044 705

(51) Int. Cl.
  C09K 19/32  (2006.01)
  C09K 19/30  (2006.01)
  C07C 43/225  (2006.01)
  C07C 25/24  (2006.01)

(52) U.S. Cl. .............. 428/1.1; 252/299.62; 252/299.63; 568/647; 570/128; 570/129; 570/187; 570/188

(58) Field of Classification Search ............ 252/299.61, 252/299.62, 299.63; 428/1.1; 568/329, 647, 568/807; 570/128, 129, 187, 188
See application file for complete search history.

(56) References Cited

U.S. PATENT DOCUMENTS

| | | | |
|---|---|---|---|
| 5,384,072 A | 1/1995 | Poetsch et al. | |
| 5,445,764 A | 8/1995 | Poetsch et al. | |
| 5,545,747 A | 8/1996 | Kawaguchi | |
| 7,270,856 B2* | 9/2007 | Taugerbeck et al. | 428/1.1 |
| 2004/0242905 A1 | 12/2004 | Poetsch et al. | |
| 2006/0022168 A1 | 2/2006 | Taugerbeck | |

FOREIGN PATENT DOCUMENTS

| | | |
|---|---|---|
| DE | 38 07 872 A1 | 9/1989 |
| DE | 42 19 283 A1 | 12/1993 |
| DE | 42 35 974 A1 | 4/1994 |
| DE | 42 35 975 A1 | 4/1994 |
| DE | 42 39 169 A1 | 5/1994 |
| DE | 198 57 506 A1 | 6/2000 |
| DE | 103 38 111 A1 | 3/2004 |
| EP | 1 482 018 A | 12/2004 |
| GB | 2 155 946 A | 10/1985 |
| WO | WO 88/09322 A | 12/1988 |
| WO | WO 92/16483 A | 10/1992 |
| WO | WO 2004/050594 A1 | 3/2004 |
| WO | WO 2004/050796 A | 6/2004 |

OTHER PUBLICATIONS

Chan L K M et al: "Synthesis and Liquid Crystal Properties of Dimethylene Linked Compounds Incorporating the Cyclobutane or Spiro 3.3 Heptane Rings" Molecular Crystals and Liquid Crystals (Inc. Nonlinear Optics ), Gordon and Breach Science Publishers, Reading, GB, BD. 168, (Mar. 1, 1989), XP000102961.

* cited by examiner

*Primary Examiner*—Shean C Wu
(74) *Attorney, Agent, or Firm*—Millen, White, Zelano & Branigan, P.C.

(57) ABSTRACT

The present invention relates to cyclobutane and spiro[3.3] heptane compounds, to a process for the preparation thereof, to the use thereof as components in liquid-crystalline media, and to electro-optical display elements which contain these liquid-crystalline media.

19 Claims, No Drawings

CYCLOBUTANE AND SPIRO[3.3]HEPTANE COMPOUNDS

The present invention relates to cyclobutane and spiro[3.3] heptane compounds, to a process for the preparation thereof, to the use thereof as components in liquid-crystalline media, and to electro-optical display elements which contain these liquid-crystalline media.

Liquid crystals have found widespread use since the first commercially usable liquid-crystalline compounds were found about 30 years ago. Known areas of application are, in particular, displays for watches and pocket calculators, and large display panels as used in railway stations, airports and sports arenas. Further areas of application are displays of portable computers and navigation systems, and television and video applications. For the last-mentioned applications in particular, high demands are made of the response times and contrast of the images.

The spatial arrangement of the molecules in a liquid-crystalline medium has the effect that many of its properties are direction-dependent. Of particular importance for use in liquid-crystal displays are the optical, dielectric and elasto-mechanical anisotropies. Depending on whether the molecules are oriented with their longitudinal axes perpendicular or parallel to the two plates of a capacitor, the latter has a different capacitance; in other words, the dielectric constant $\in$ of the liquid-crystalline medium has different values for the two orientations. Substances whose dielectric constant is greater when the longitudinal axes of the molecules are oriented perpendicular to the capacitor plates than when they are oriented parallel are referred to as dielectrically positive. In other words, if the dielectric constant $\in_\parallel$ parallel to the longitudinal axes of the molecules is greater than the dielectric constant $\in_\perp$ perpendicular to the longitudinal axes of the molecules, the dielectric anisotropy $\Delta\in = \Delta_\parallel - \in_\perp$ is greater than zero. Most liquid crystals used in conventional displays fall into this group.

Both the polarizability of the molecule and the permanent dipole moment play a role for the dielectric anisotropy. On application of a voltage to the display, the longitudinal axis of the molecules orients itself in such a way that the larger of the dielectric constants becomes effective. The strength of the interaction with the electric field depends on the difference between the two constants. In the case of small differences, higher switching voltages are necessary than in the case of large differences. The introduction of suitable polar groups, such as, for example, nitrile groups or fluorine, into the liquid-crystal molecules enables a broad range of working voltages to be achieved.

In the case of the mesogenic or liquid-crystalline molecules used in conventional liquid-crystal displays, the dipole moment oriented along the longitudinal axis of the molecules is larger than the dipole moment oriented perpendicular to the longitudinal axis of the molecules. In the most wide-spread TN ("twisted nematic") cells, a liquid-crystalline layer with a thickness of only about 5 to 10 μm is arranged between two plane-parallel glass plates, onto each of which an electrically conductive, transparent layer of tin oxide or indium-tin oxide (ITO) has been vapour-deposited as electrode. A likewise transparent alignment layer, usually consisting of a plastic (for example polyimides), is located between these films and the liquid-crystalline layer. This alignment layer serves to bring the longitudinal axes of the adjacent crystalline molecules into a preferential direction through surface forces in such a way that, in the voltage-free state, they lie uniformly with the same orientation, flat or with the same small tilt angle, on the inside of the display surface. Two polarization films which only enable linear-polarized light to enter and escape are applied to the outside of the display in a certain arrangement.

By means of liquid crystals in which the larger dipole moment is oriented parallel to the longitudinal axis of the molecule, very high-performance displays have already been developed. In most cases here, mixtures of 5 to 20 components are used in order to achieve a sufficiently broad temperature range of the mesophase and short response times and low threshold voltages. However, difficulties are still caused by the strong viewing-angle dependence in liquid-crystal displays as are used, for example, for laptops. The best imaging quality can be achieved if the surface of the display is perpendicular to the viewing direction of the observer. If the display is tilted relative to the observation direction, the imaging quality deteriorates drastically under certain circumstances. For greater comfort, attempts are being made to maximize the angle through which the display can be tilted from the viewing direction of an observer without significantly reducing the imaging quality. Attempts have recently been made to improve the viewing-angle dependence using liquid-crystalline compounds whose dipole moment perpendicular to the longitudinal axis of the molecule is larger than that parallel to the longitudinal axis of the molecule. The dielectric anisotropy $\Delta\in$ is negative. In the field-free state, these molecules are oriented perpendicular to the glass surface of the display. Application of an electric field causes them to orient themselves more or less parallel to the glass surfaces. By achieving a plurality of domains, it has been possible to achieve an improvement in the viewing-angle dependence using liquid-crystalline media of negative dielectric anisotropy. This technology can also be used to achieve shorter response times in displays and better contrast values. Displays of this type are known as VA-TFT ("vertically aligned") displays.

Development in the area of liquid-crystalline materials is still far from complete. In order to improve the properties of liquid-crystalline display elements, attempts are constantly being made to develop novel compounds which enable optimization of such displays.

DE 10338111 A1, DE 4239169 A1, GB 2155946 A and DE 3717484 A1 disclose cyclobutane or spiro[3.3]heptane compounds without the 2,3-difluorophenylene group.

DE 4235975 A1 and DE 4235974 A1 disclose methylene cyclobutanes and corresponding spiro[3.3]heptanes without the 2,3-difluorophenylene group.

DE 3807872 A1 discloses 2,3-difluorophenylene compounds, but not cyclobutane or spiro[3.3]heptane compounds.

It is an object of the present invention to provide compounds having advantageous properties for use in liquid-crystalline media. Advantageous means, depending on the area of application, compliance with certain material parameters. In addition, it is in most cases important to achieve a balanced ratio of a plurality of material properties simultaneously. The behaviour of the compounds in a mixture with other components should likewise be included in the consideration in practice. Very multifarious requirements can therefore generally be formulated for novel components of liquid-crystalline mixtures. For practical use, it is advantageous to have the largest possible repertoire of compounds with which all necessary combinations of desired material properties can be achieved.

This object is achieved in accordance with the invention by the provision of compounds of the general formula I

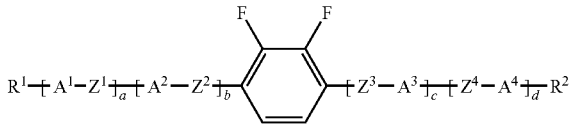

in which, in each case independently of one another, identically or differently, R$^1$ and R$^2$ denote hydrogen, an alkanyl, alkoxy, alkenyl or alkynyl having up to 15 carbon atoms which is unsubstituted or mono- or polysubstituted by F, where, in addition, one or more CH$_2$ groups in these radicals may each be replaced, independently of one another, by —O—, —S—, —SO$_2$—, —CO—, —(CO)O—, —O(CO)— or —O(CO)—O— in such a way that heteroatoms are not linked directly, or a group of the formula

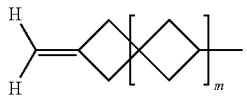

A$^1$, A$^2$, A$^3$ and A$^4$ denote cyclohexylene, in which, in addition, one or two CH$_2$ may be replaced by 0, phenylene, which may be unsubstituted or mono- or disubstituted by F, a single bond or

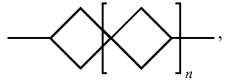

Z$^1$, Z$^2$, Z$^3$ and Z$^4$ denote a single bond, —CF$_2$O—, —OCF$_2$—, —CH$_2$CH$_2$—, —CF$_2$CF$_2$—, —CF$_2$CH$_2$—, —CH$_2$CF$_2$—, —CHF—CHF—, —(CO)O—, —O(CO)—, —CH$_2$O—, —OCH$_2$—, —CF═CH—, —CH═CF—, —CF═CF—, —CH═CH— or —C≡C—, a, b, c and d denote 0, 1 or 2, and n and m denote 0 or 1, with the proviso that at least one group from R$^1$ and R$^2$ denotes

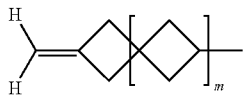

or at least one group from A$^1$, A$^2$, A$^3$ and A$^4$ denotes

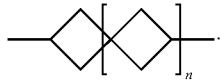

If A$^{1-4}$ or Z$^{1-4}$ occur more than once in the formulae (a, b, c or d=2), they can, independently of one another, adopt identical or different meanings.

The preferred compounds have negative Δ∈ and are therefore suitable, in particular, for use in VA-TFT displays. The compounds according to the invention preferably have a Δ∈ of <−2 and particularly preferably a Δ∈ of <−5. They exhibit very good compatibility with the usual substances used in liquid-crystal mixtures for displays.

Furthermore, the compounds of the formula I according to the invention have values for the optical anisotropy Δn which are particularly suitable for use in VA-TFT displays. The compounds according to the invention preferably have a Δn of greater than 0.02 and less than 0.30, preferably greater than 0.04 and less than 0.15.

The other physical, physicochemical or electro-optical parameters of the compounds according to the invention are also advantageous for use of the compounds in liquid-crystalline media. The compounds have, in particular, a sufficient breadth of the nematic phase and good low-temperature and long-term stability as well as sufficiently high clearing points. In particular, they have low rotational viscosity at the same time as relatively high clearing points. Furthermore, the compounds according to the invention are distinguished by a high specific resistance.

The compounds of the formula I according to the invention are furthermore suitable for the preparation of further, optionally more complex mesogenic or liquid-crystalline substances which have cyclobutane or spiro[3.3]heptane and a 2,3-difluorophenylene as structural elements.

If R$^1$ and R$^2$ in the formula I each, independently of one another, represent an alkanyl radical and/or an alkoxy radical (alkyloxy radical) having 1 to 15 C atoms, these are straight-chain or branched. Each of these radicals is preferably straight-chain, has 1, 2, 3, 4, 5, 6 or 7 C atoms and is accordingly preferably methyl, ethyl, propyl, butyl, pentyl, hexyl, heptyl, methoxy, ethoxy, propoxy, butoxy, pentoxy, hexoxy or heptoxy.

R$^1$ and R$^2$ in the formula I may each, independently of one another, also be an oxaalkyl radical, i.e. an alkanyl radical in which at least one of the non-terminal CH$_2$ groups has been replaced by —O—, preferably straight-chain 2-oxapropyl (=methoxymethyl), 2-(=ethoxymethyl) or 3-oxabutyl (=methoxyethyl), 2-, 3- or 4-oxapentyl, 2-, 3-, 4- or 5-oxahexyl, 2-, 3-, 4-, 5- or 6-oxaheptyl. In a corresponding manner, R$^1$ and R$^2$ in the formula I may also, independently of one another, be thioalkanyl or sulfonealkanyl radicals, i.e. alkanyl radicals in which one CH$_2$ group has been replaced by —S— or —SO$_2$—.

R$^1$ and R$^2$ in the formula I may furthermore each, independently of one another, be an alkenyl radical having 2 to 15 C atoms which is straight-chain or branched and has at least one C═C double bond. It is preferably straight-chain and has 2 to 7 C atoms. Accordingly, it is preferably vinyl, prop-1- or -2-enyl, but-1-, -2- or -3-enyl, pent-1-, -2-, -3- or -4-enyl, hex-1-, -2-, -3-, -4- or -5-enyl, or hept-1-, -2-, -3-, -4-, -5- or -6-enyl. If the two C atoms of the C═C double bond are substituted, the alkenyl radical can be in the form of the E and/or Z isomer (trans/cis). In general, the respective E isomers are preferred.

In the same way as for an alkanyl radical, at least one of the CH$_2$ groups in an alkenyl radical may also be replaced by oxygen, sulfur or —SO$_2$—. In the case of replacement by —O—, an alkenyloxy radical (having a terminal oxygen) or an oxaalkenyl radical (having a non-terminal oxygen) is then present.

R$^1$ and R$^2$ in the formula I may also, independently of one another, be an alkynyl radical having 2 to 15 C atoms which is straight-chain or branched and has at least one C—C triple bond.

R$^1$ and R$^2$ in the formula I may each, independently of one another, be an alkanyl radical having 1 to 15 C atoms in which one CH$_2$ group has been replaced by —O— and one has been replaced by —CO—, these preferably being adjacent. This thus contains an acyloxy group —CO—O— or an oxycarbonyl group —O—CO—. This radical is preferably straight-chain and has 2 to 6 C atoms. The following of these radicals are preferred here: acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 2-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl and 4-(methoxycarbonyl)butyl. Furthermore, an alkanyl radical can also contain an —O(CO)—O— unit. Replacement of a CH$_2$ group by only one —CO— group (carbonyl function) is also possible.

R$^1$ and R$^2$ in the formula I may each, independently of one another, be an alkenyl radical having 2 to 15 C atoms in which a CH$_2$ group, preferably in the vicinity of an unsubstituted or substituted —C=C— unit, has been replaced by —CO—, —(CO)O—, —O(CO)— or —O(CO)—O—, where this radical may be straight-chain or branched. The radical is preferably straight-chain and has 4 to 13 C atoms. Particular preference is given here to acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl and 8-methacryloyloxyoctyl. Correspondingly, a CH$_2$ group in an alkynyl radical, in particular in the vicinity of a substituted —C≡C— unit, may also be replaced by —CO—, —(CO)O—, —O(CO)— or —O(CO)—O—.

R$^1$ and R$^2$ in the formula I may each, independently of one another, be an alkanyl radical in which two or more CH$_2$ groups have been replaced by —O— and/or —CO—O—, where this may be straight-chain or branched. It is preferably branched and has 3 to 12 C atoms.

R$^1$ and R$^2$ in the formula I may each, independently of one another, be an alkanyl radical or alkoxy radical having 1 to 15 C atoms or an alkenyl radical, alkenyloxy radical or alkynyl radical having 2 to 15 C atoms, each of which is mono- or polysubstituted by F, where these radicals are preferably straight-chain. The mono- or polyfluorinated radicals are also referred to as "fluoroalkyl", "fluoroalkanyl", "fluoroalkoxy", "fluoroalkenyl", "fluoroalkenyloxy" or "fluoroalkynyl". In the case of monosubstitution, the fluorine can be in any desired position, preferably in the c-position.

R$^1$ and R$^2$, independently of one another, preferably denote alkanyl, alkenyl or alkoxy, each having up to 8 carbon atoms, hydrogen or a group of the formula

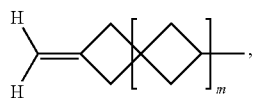

particularly preferably alkanyl, alkoxy or a group of the formula

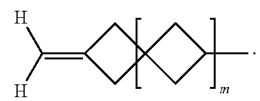

In particular, R$^1$ stands for alkyl, alkenyl or a group of the formula

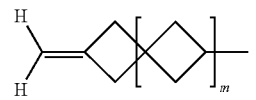

and R$^2$ preferably stands for alkyl or alkoxy.

The rings A$^1$, A$^2$, A$^3$ and A$^4$ are preferably, independently of one another, selected from the group consisting of:

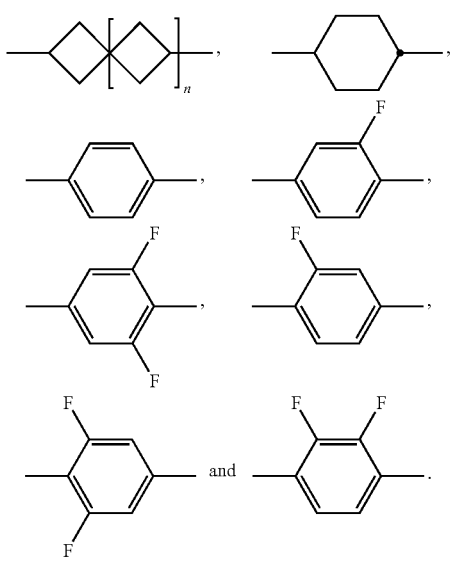

Of the phenylene rings, preference is given to

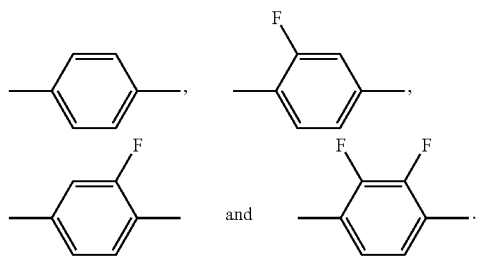

The compounds of the formula I contain at least one of the structural elements spiro[3.3]heptane ring and cyclobutane ring. The compounds of the formula I preferably simultaneously contain only one spiro[3.3]heptane ring or only one cyclobutane ring. If one of the groups from R$^1$ and R$^2$ represents a group of the formula

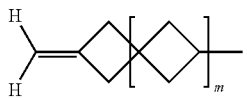

the rings $A^1$, $A^2$, $A^3$ and $A^4$ are then preferably cyclohexylene, in which, in addition, one or two $CH_2$ may be replaced by O, or a 1,4-phenylene, which may be unsubstituted or mono- or disubstituted by F.

In the case where at least one of the groups from $A^1$, $A^2$, $A^3$ and $A^4$ represents a group of the formula

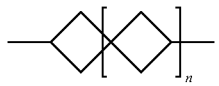

$R^1$ and $R^2$ are then preferably, independently of one another, hydrogen, an alkanyl, alkoxy, alkenyl or alkynyl having up to 15 carbon atoms which is unsubstituted or mono- or polysubstituted by F, where, in addition, one or more $CH_2$ groups in these radicals may each be replaced, independently of one another, by —O—, —S—, —SO$_2$—, —CO—, —(CO)O—, —O(CO)— or —O(CO)—O— in such a way that heteroatoms are not linked directly. In this case, $R^1$ and $R^2$ are preferably alkanyl, alkenyl or alkoxy, each having up to 8 carbon atoms.

The indices a, b, c and d are preferably selected in such a way that the number of rings $A^{1-4}$ together with the number of rings in $R^1$ and $R^2$ is in the range from 1 to 3, in particular in the range from 1 to 2. If $R^1$ and $R^2$ do not contain a ring element, a+b+c+d is in the range from 1 to 3, preferably from 1 to 2. If $R^1$ and $R^2$ together contain precisely one ring element, a+b+c+d is in the range from 0 to 2, preferably from 0 to 1. If $R^1$ and $R^2$ together contain precisely two ring elements, a+b+c+d is in the range from 0 to 1, preferably 0.

The total number of ring systems in the compounds according to the invention is very particularly preferably 3, where the spiro system counts as one ring system.

In a preferred embodiment of the invention, the compounds of the formula I are asymmetric in that c+d=0 and a+b>0.

Besides the central 2,3-difluorophenylene ring, the compounds of the formula I according to the invention preferably contain either one further or two further ring systems of the formulae $A^1$, $A^2$, $A^3$ and/or $A^4$, i.e. a+b+c+d is preferably 1 or 2. If two further rings are present, they may both be on one side of the 2,3-difluorophenylene ring or they are distributed on both sides of the phenylene ring.

In a preferred embodiment of the invention, m and n are 1 in order to obtain compounds having broader nematic phase ranges. Alternatively, m and n are 0 in order to obtain lower values for the rotational viscosity. $Z^1$, $Z^2$, $Z^3$ and $Z^4$ are preferably, independently of one another, a single bond, —CH$_2$O—, —OCH$_2$—, —CH$_2$CH$_2$—, —CF$_2$CF$_2$— or —CH=CH—, particularly preferably a single bond, —CH$_2$O— or —OCH$_2$— and in particular a single bond.

Particular preference is given to compounds in which at least one of the rings $A^{1-4}$ is a 1,4-cyclohexylene.

Preferred compounds according to the invention are reproduced by the general formulae IA to IC in which $R^{11}$ and $R^{22}$, independently of one another, denote hydrogen, an alkanyl, alkoxy, alkenyl or alkynyl having up to 15 carbon atoms which is unsubstituted or mono- or polysubstituted by F, where, in addition, one or more $CH_2$ groups in these radicals may each be replaced, independently of one another, by —O—, —S—, —SO$_2$—, —CO—, —(CO)O—, —O(CO)— or —O(CO)—O— in such a way that heteroatoms are not linked directly:

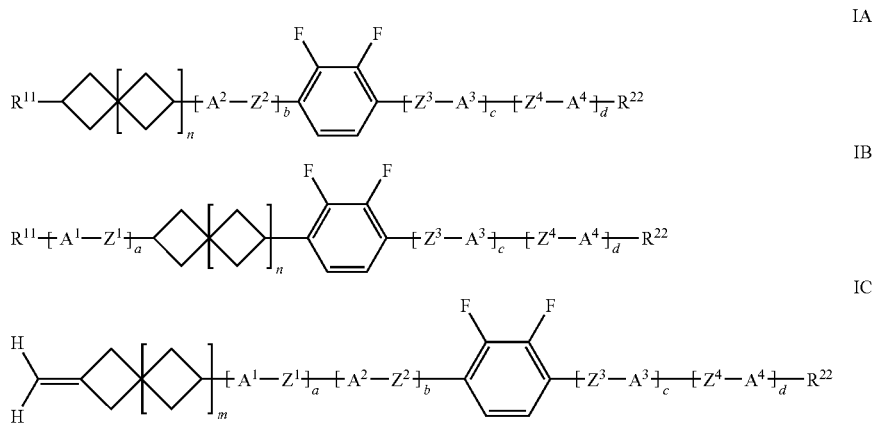

Preference is given to compounds of the formulae IA and IB, in particular those in which c+d=0 and/or n=1.

Of the compounds of the formula IA, particular preference is given to compounds of the general formulae IA1 to IA8:

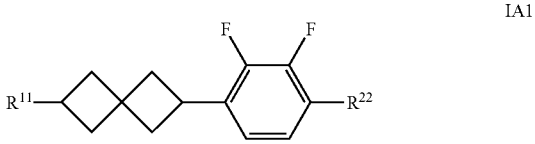

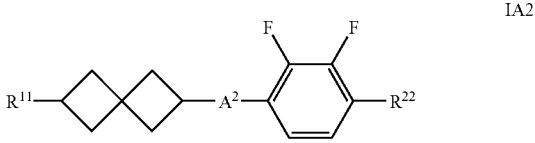

-continued

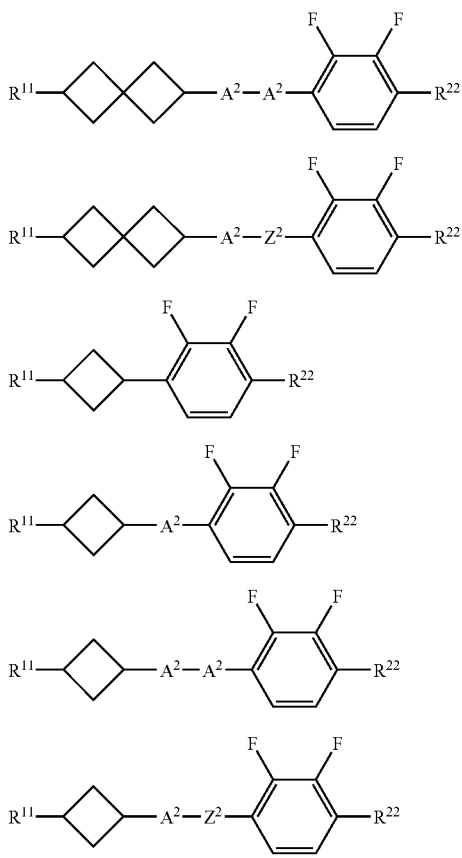

IA3
IA4
IA5
IA6
IA7
IA8

Of these, particular preference is given to the compounds of the formulae IA1, IA2, IA6 and IA7.

Illustrative compounds of the formula IA are the following compounds:

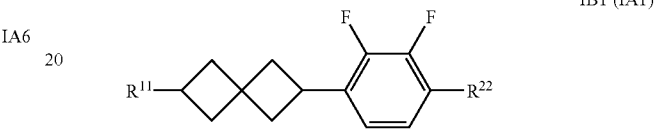
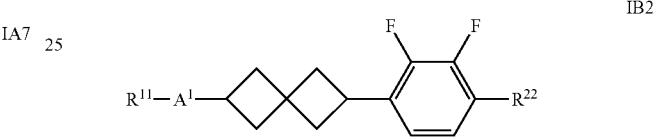
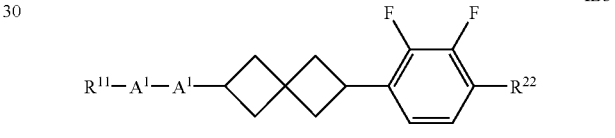
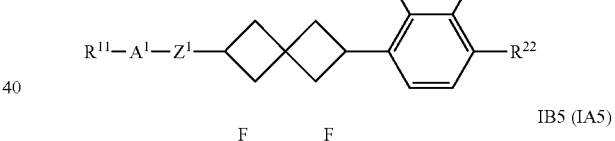
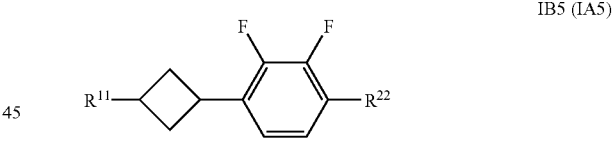

-continued

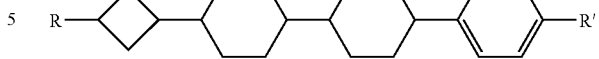

in which R and R', independently, denote an alkyl, alkoxy, alkenyl or alkenyloxy. R' preferably denotes alkoxy, in particular having 1-5 C atoms, for example a methoxy or ethoxy group. The radical R denotes, for example, an ethyl, n-propyl or n-butyl group.

Of the compounds of the formula IB, particular preference is given to the compounds of the general formulae IB1 to IB8:

IB1 (IA1)
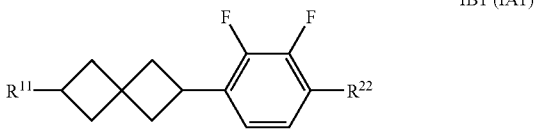

IB2
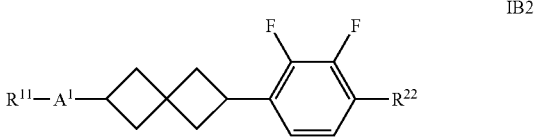

IB3
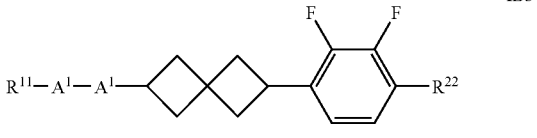

IB4
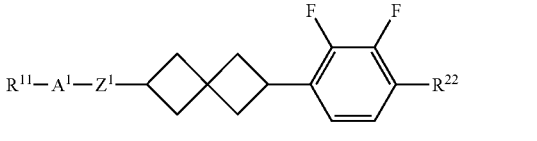

IB5 (IA5)
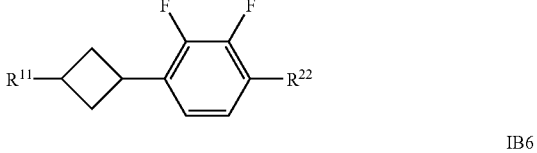

IB6
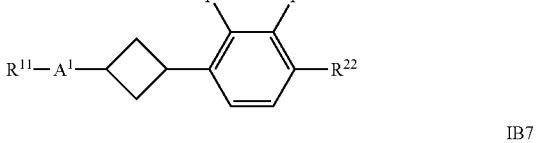

IB7
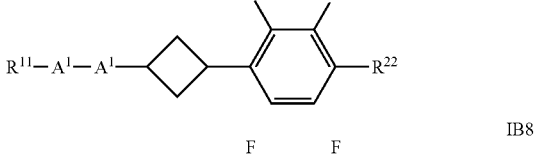

IB8
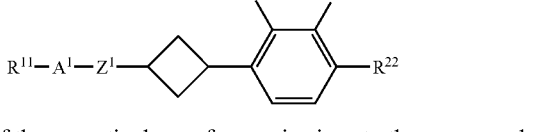

Of these, particular preference is given to the compounds of the formulae IB1, IB2, IB5 and IB6, in particular of the formula IB2.

Illustrative compounds of the formula IB are the following compounds:

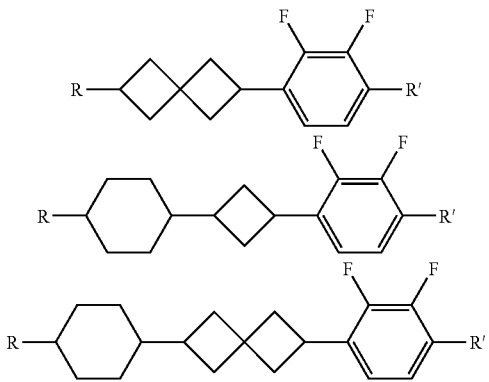

in which R and R', independently, denote an alkyl, alkoxy, alkenyl or alkenyloxy. R' preferably denotes alkoxy, in particular having 1-5 C atoms, for example a methoxy or ethoxy group. The radical R denotes, for example, an ethyl, n-propyl or n-butyl group.

Of the compounds of the formula IC, particular preference is given to the compounds of the general formulae IC1 to IC6:

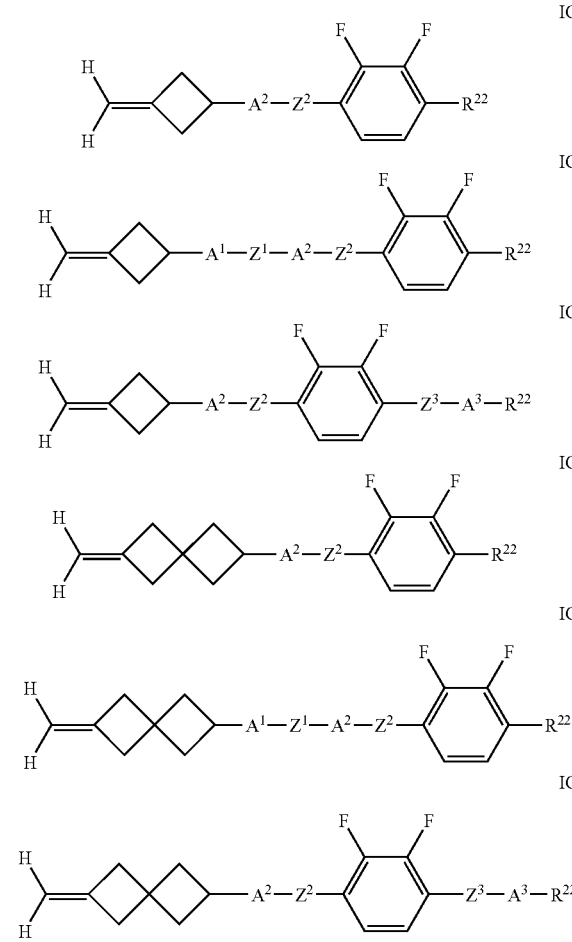

Of these, particular preference is given to the compounds in which $Z^1$ and $Z^2$ denote a single bond or $A^1$ and $A^2$ preferably represent a ring system as defined above for formula I, with the exception of the single bond.

Illustrative compounds of the formula IC are the following compounds:

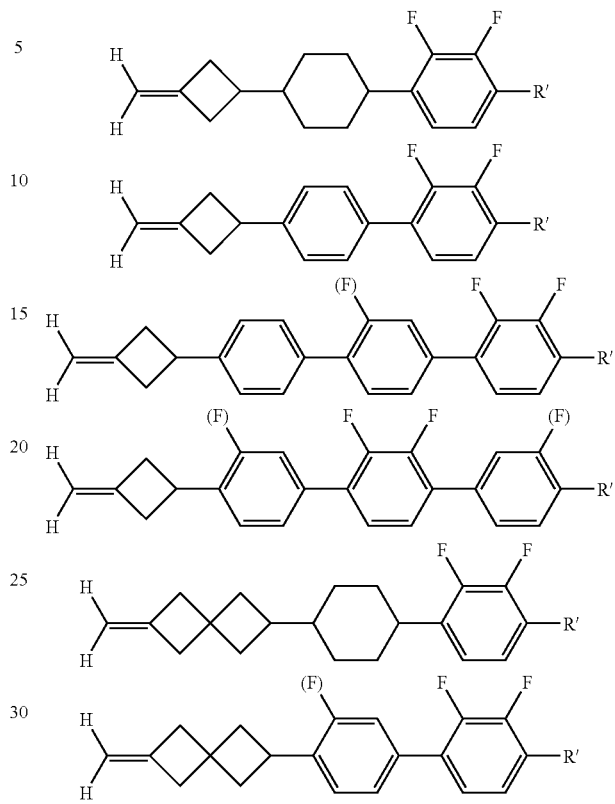

in which R', independently, denotes an alkyl, alkoxy, alkenyl or alkenyloxy. R' denotes, for example, alkoxy, in particular having 1-5 C atoms, for example a methoxy or ethoxy group.

The compounds of the general formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can be made here of variants known per se, which are not mentioned here in greater detail. If desired, the starting materials can also be formed in situ, i.e. by not isolating them from the reaction mixture, but instead immediately converting them further into the compounds of the general formula I. The starting substances can be obtained by generally accessible literature methods or are commercially available.

The compounds of the formula I according to the invention are also accessible by the following processes.

The reaction steps depicted in scheme 1 are suitable for building up a cyclobutane ring and, starting therefrom, a spiro[3.3]heptane ring system. Starting from substituted alkenes ($H_2C=CH—R$), one or two cyclobutane rings are built up successively, which results firstly in the intermediates of the formula A (cyclobutanones) or B (spiro[3.3]heptanones). The radical R stands for a moiety of the target compounds or for a precursor thereof, generally for any desired organic moiety.

An embodiment of the invention is therefore a process for the preparation of compounds of the formula I which is characterized in that, in at least one process step, a terminal alkene is converted at the double bond using trichloroacetyl chloride into a 2,2-dichlorocyclobutan-1-on-3-yl compound. This process step is preferably carried out once, for the preparation of a cyclobutane of the formula I, or twice, for the preparation of spiro compounds of the formula II. In particular, this process step is carried out using zinc. The amount of reagents employed is preferably at least stoichiometric, preferably in a 1.5- to 3-fold excess. A catalytic amount of a copper salt, in particular Cu(II) acetate, is preferably added in order to activate the zinc.

-continued

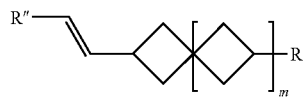

Scheme 1. Synthesis of ketone precursors of the cyclobutanes A and spiro[3.3]heptanes B. R stands for any desired organic radical -$[Z^1-A^1]_a-R^1$ according to the formula I or suitable precursors thereof.

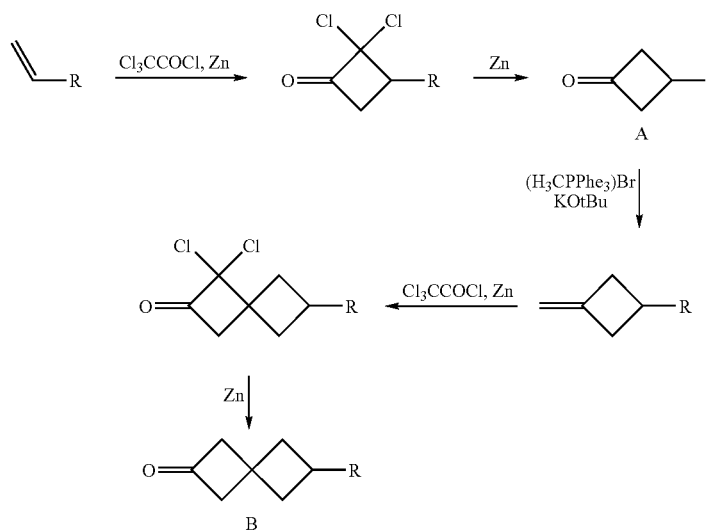

The cyclobutane ketones A and B are eminently suitable for further derivatization at the carbonyl function by a Wittig olefinization or by the addition reaction of a metal compound onto the carbonyl group with subsequent reductive removal of the resultant OH group. A wide variety of compounds according to the invention are accessible in accordance with this principle (scheme 2). If the carbonyl function is reduced completely, compounds of the general formula I according to the invention in which one of the rings $A^{1-4}$ denotes a cyclobutane or a spiro[3.3]heptane and the adjacent group $R^1$ or $R^2$ stands for hydrogen are obtained. The complete reduction of the carbonyl group can be carried out, for example, by the Clemmensen method (Zn/Hg, HCl) or by the Wolff-Kishner method (hydrazine hydrate, base).

Scheme 2. Methods for the derivatisation of the cyclobutyl ketones A and B. R stands, for example, for alkyl, generally for a radical -$[Z^1-A^1]_a-R^1$ according to formula I or for suitable precursors. R' is, for example, alkyl or alkoxy and R'' is, for example, alkyl.

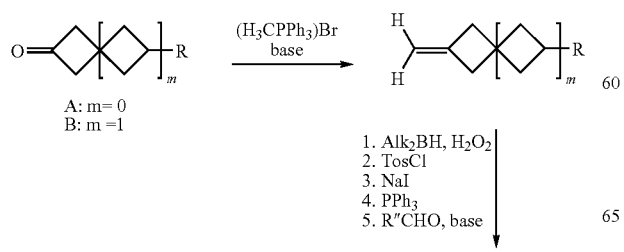

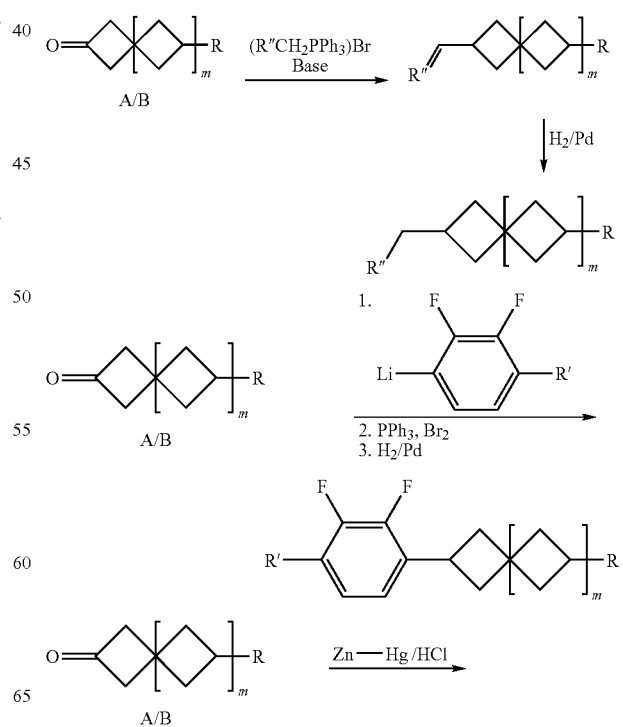

-continued

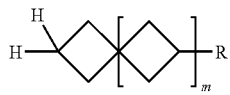

The synthesis of the alkenes which serve as starting materials for the cyclobutane formation can be carried out, for example, by the reactions depicted in schemes 3a/3b. The Wittig olefinization using methyltriphenylphosphonium bromide ($H_3C$—$PPh_3$)Br is highly suitable for converting carbonyl groups into terminal alkenes. Numerous standard preparative methods are available for the formation of the carbonyl groups in the requisite positions.

Scheme 3a. Preparation of alkenes as starting materials for the cyclobutane synthesis and for the spiro[3.3]heptanes. R' stands, for example, for an alkyl or alkoxy radical, generally for a radical such as -[$Z^1$-$A^1$]$_a$-$R^1$ in the formula I.

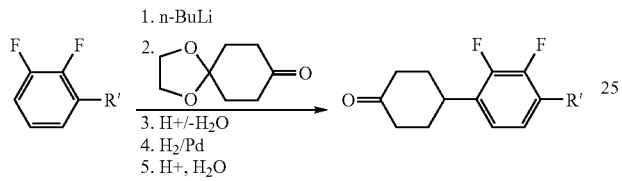

Scheme 3b. Preparation of alkenes as starting materials for the cyclobutane synthesis and for the spiro[3.3]heptanes. R' stands, for example, for an alkyl or alkoxy radical, (A)$_n$ for one or more rings or a single bond.

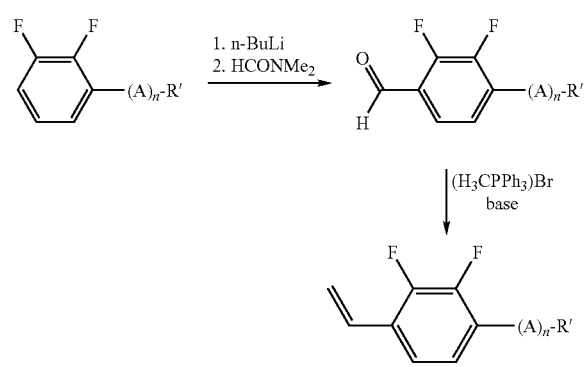

The compounds prepared in accordance with scheme 2 are frequently already the desired end compounds for the purposes of the invention. For some of the compounds according to the invention, however, it may be advantageous to introduce missing moieties not until subsequent derivatization. Scheme 4 shows synthetic methods for the later derivatization of the cyclobutane and spiro[3.3]heptane compounds.

Scheme 4. Subsequent derivatisation of the cyclobutane and spiro[3.3]-heptane compounds. R and R' stand, for example, for an alkyl or alkoxy radical, generally for a radical such as -[$Z^1$-$A^1$]$_a$-$R^1$ in formula I.

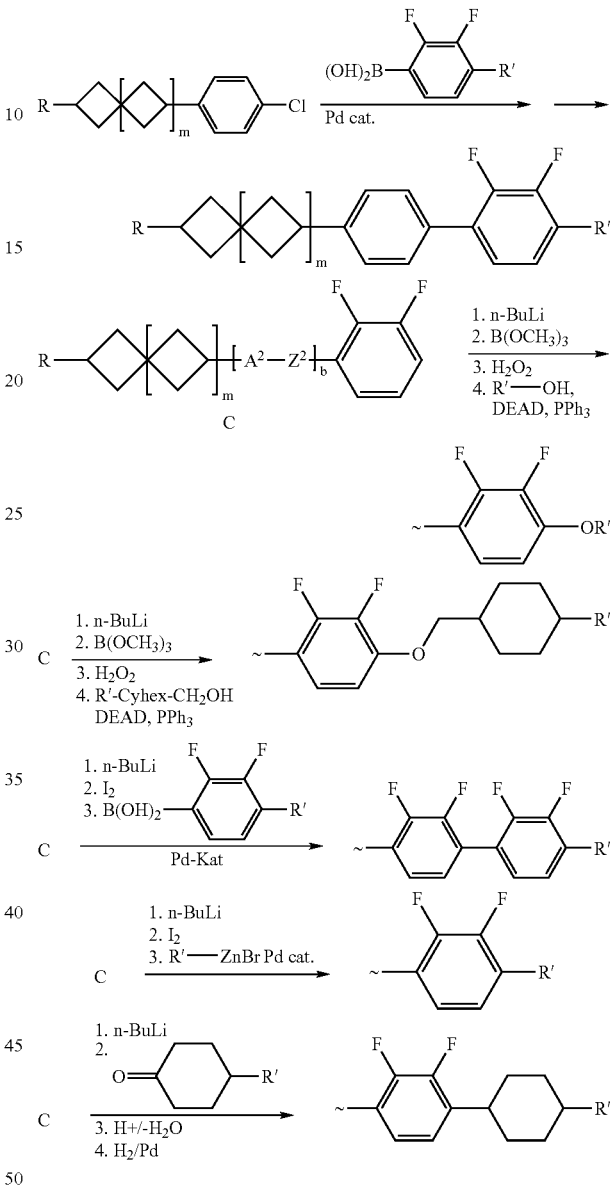

Conversely, it is possible firstly to introduce the cyclobutane and spiro-[3.3]heptane structures during derivatization of a (mesogenic) parent structure. An illustrative synthesis is shown in Scheme 5.

Scheme 5. Subsequent introduction of the cyclobutane or spiro[3.3]heptane structure into a 2,3-difluorophenyl group.

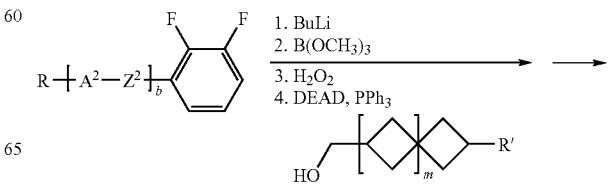

-continued

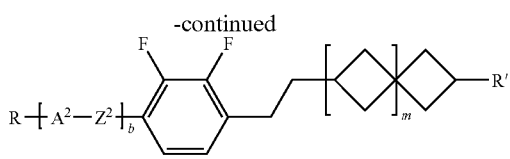

Combination of the syntheses depicted enables all compounds according to the invention to be prepared.

Modifications and variations of the said processes can readily be carried out by the person skilled in the art on the basis of his knowledge. Study of the attached examples will illustrate these processes in greater detail.

As already mentioned, the compounds of the general formula I can be used in liquid-crystalline media.

The present invention therefore also relates to a liquid-crystalline medium having at least two liquid-crystalline compounds, comprising at least one compound of the general formula I.

The present invention also relates to liquid-crystalline media comprising 2 to 40, preferably 4 to 30, components as further constituents besides one or more compounds of the formula I according to the invention. These media particularly preferably comprise 7 to 25 components besides one or more compounds according to the invention. These further constituents are preferably selected from nematic or nematogenic (monotropic or isotropic) substances, in particular substances from the classes of the azoxybenzenes, benzylideneanilines, biphenyls, terphenyls, 1,3-dioxanes, 2,5-tetrahydropyrans, phenyl or cyclohexyl benzoates, phenyl or cyclohexyl esters of cyclohexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid or of cyclohexylcyclohexanecarboxylic acid, phenylcyclohexanes, cyclohexylbiphenyls, phenylcyclohexylcyclohexanes, cyclohexylcyclohexanes, cyclohexylcyclohexylcyclohexenes, 1,4-biscyclohexylbenzenes, 4',4'-biscyclohexylbiphenyls, phenyl- or cyclohexylpyrimidines, phenyl- or cyclohexylpyridines, phenyl- or cyclohexyldioxanes, phenyl- or cyclohexyl-1,3-dithianes, 1,2-diphenylethanes, 1,2-dicyclohexylethanes, 1-phenyl-2-cyclohexylethanes, 1-cyclohexyl-2-(4-phenylcyclohexyl)-ethanes, 1-cyclohexyl-2-biphenylethanes, 1-phenyl-2-cyclohexylphenylethanes, optionally halogenated stilbenes, benzyl phenyl ethers, tolans and substituted cinnamic acids. The 1,4-phenylene groups in these compounds may also be mono- or polyfluorinated.

The most important compounds suitable as further constituents of media according to the invention can be characterized by the formulae (1), (2), (3), (4) and (5):

R'-L-E-R"     (1)

R'-L-COO-E-R"     (2)

R'-L-OOC-E-R"     (3)

R'-L-CH$_2$CH$_2$-E-R"     (4)

R'-L-CF$_2$O-E-R"     (5)

In the formulae (1), (2), (3), (4) and (5), L and E, which may be identical or different, each, independently of one another, denote a divalent radical selected from the group formed by -Phe-, -Cyc-, -Phe-Phe-, -Phe-Cyc-, -Cyc-Cyc-, -Pyr-, -Dio-, -Thp-, -G-Phe- and -G-Cyc- and their mirror images, where Phe denotes unsubstituted or fluorine-substituted 1,4-phenylene, Cyc denotes trans-1,4-cyclohexylene or 1,4-cyclohexenylene, Pyr denotes pyrimidine-2,5-diyl or pyridine-2,5-diyl, Dio denotes 1,3-dioxane-2,5-diyl, Thp denotes tetrahydropyran-2,5-diyl and G denotes 2-(trans-1,4-cyclohexyl)ethyl, pyrimidine-2,5-diyl, pyridine-2,5-diyl, 1,3-dioxane-2,5-diyl or tetrahydropyran-2,5-diyl.

One of the radicals L and E is preferably Cyc or Phe. E is preferably Cyc, Phe or Phe-Cyc. The media according to the invention preferably comprise one or more components selected from the compounds of the formulae (1), (2), (3), (4) and (5) in which L and E are selected from the group consisting of Cyc and Phe and simultaneously one or more components selected from the compounds of the formulae (1), (2), (3), (4) and (5) in which one of the radicals L and E is selected from the group consisting of Cyc and Phe and the other radical is selected from the group consisting of -Phe-Phe-, -Phe-Cyc-, -Cyc-Cyc-, -G-Phe- and -G-Cyc-, and optionally one or more components selected from the compounds of the formulae (1), (2), (3), (4) and (5) in which the radicals L and E are selected from the group consisting of -Phe-Cyc-, -Cyc-Cyc-, -G-Phe- and -G-Cyc-.

In a smaller sub-group of the compounds of the formulae (1), (2), (3), (4) and (5), R' and R" each, independently of one another, denote alkyl, alkenyl, alkoxy, alkoxyalkyl (oxaalkyl), alkenyloxy or alkanoyloxy having up to 8 C atoms. This smaller sub-group is called group A below, and the compounds are referred to by the sub-formulae (1a), (2a), (3a), (4a) and (5a). In most of these compounds, R' and R" are different from one another, one of these radicals usually being alkyl, alkenyl, alkoxy or alkoxyalkyl (oxaalkyl).

In another smaller sub-group of the compounds of the formulae (1), (2), (3), (4) and (5), which is referred to as group B, E denotes

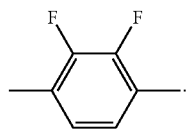

In the compounds of group B, which are referred to by the sub-formulae (1b), (2b), (3b), (4b) and (5b), R' and R" have the meaning indicated for the compounds of the sub-formulae (1a) to (5a) and are preferably alkyl, alkenyl, alkoxy or alkoxyalkyl (oxaalkyl).

In a further smaller sub-group of the compounds of the formulae (1), (2), (3), (4) and (5), R" denotes —CN. This sub-group is referred to below as group C, and the compounds of this sub-group are correspondingly described by the sub-formulae (1c), (2c), (3c), (4c) and (5c). In the compounds of the sub-formulae (1c), (2c), (3c), (4c) and (5c), R' has the meaning indicated for the compounds of the sub-formulae (1a) to (5a) and is preferably alkyl, alkenyl, alkoxy or alkoxyalkyl (oxaalkyl).

Besides the preferred compounds of groups A, B and C, other compounds of the formulae (1), (2), (3), (4) and (5) with other variants of the proposed substituents are also customary. All these substances are obtainable by methods which are known from the literature or analogously thereto.

Besides the compounds of the general formula I according to the invention, the media according to the invention preferably comprise one or more compounds from groups A, B and/or C. The proportions by weight of the compounds from these groups in the media according to the invention are:

group A: 0 to 90%, preferably 20 to 90%, in particular 30 to 90% group B: 0 to 80%, preferably 10 to 80%, in particular 10 to 70% group C: 0 to 80%, preferably 5 to 80%, in particular 5 to 50%.

The media according to the invention preferably comprise 1 to 40%, particularly preferably 5 to 30%, of the compounds of the formula I according to the invention. Preference is furthermore given to media comprising more than 40%, in particular 45 to 90%, of compounds of the formula I according to the invention. The media preferably comprise one, two, three, four or five compounds of the formula I according to the invention.

Examples of the compounds of the formulae (1), (2), (3), (4) and (5) are the compounds listed below:

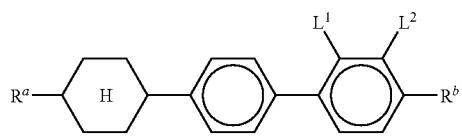

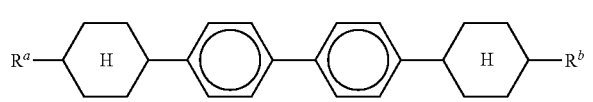

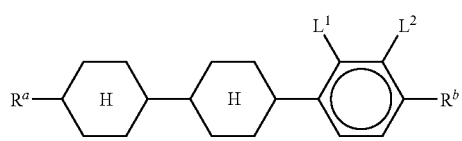

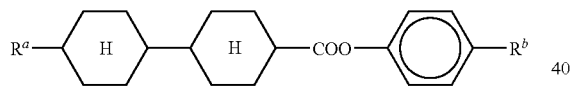

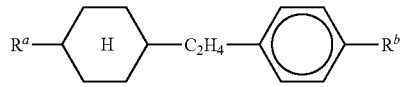

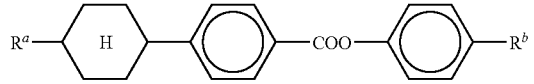

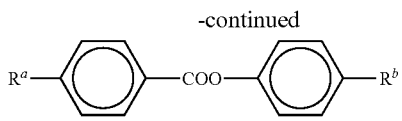

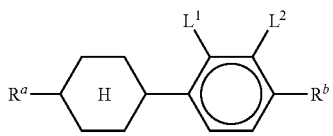

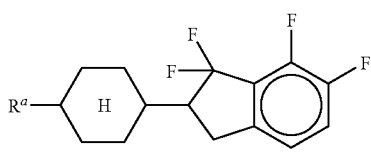

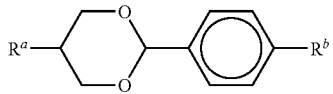

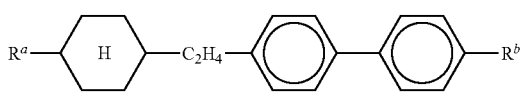

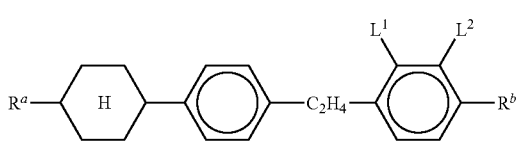

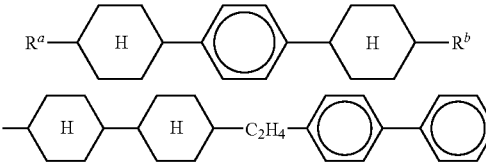

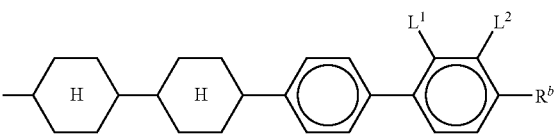

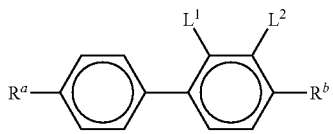

where $R^a$ and $R^b$, independently of one another, denote —$C_pH_{2p+1}$ or —$OC_pH_{2p+1}$, and p=1, 2, 3, 4, 5, 6, 7 or 8, and $L^1$ and $L^2$, independently of one another, denote —H or —F,

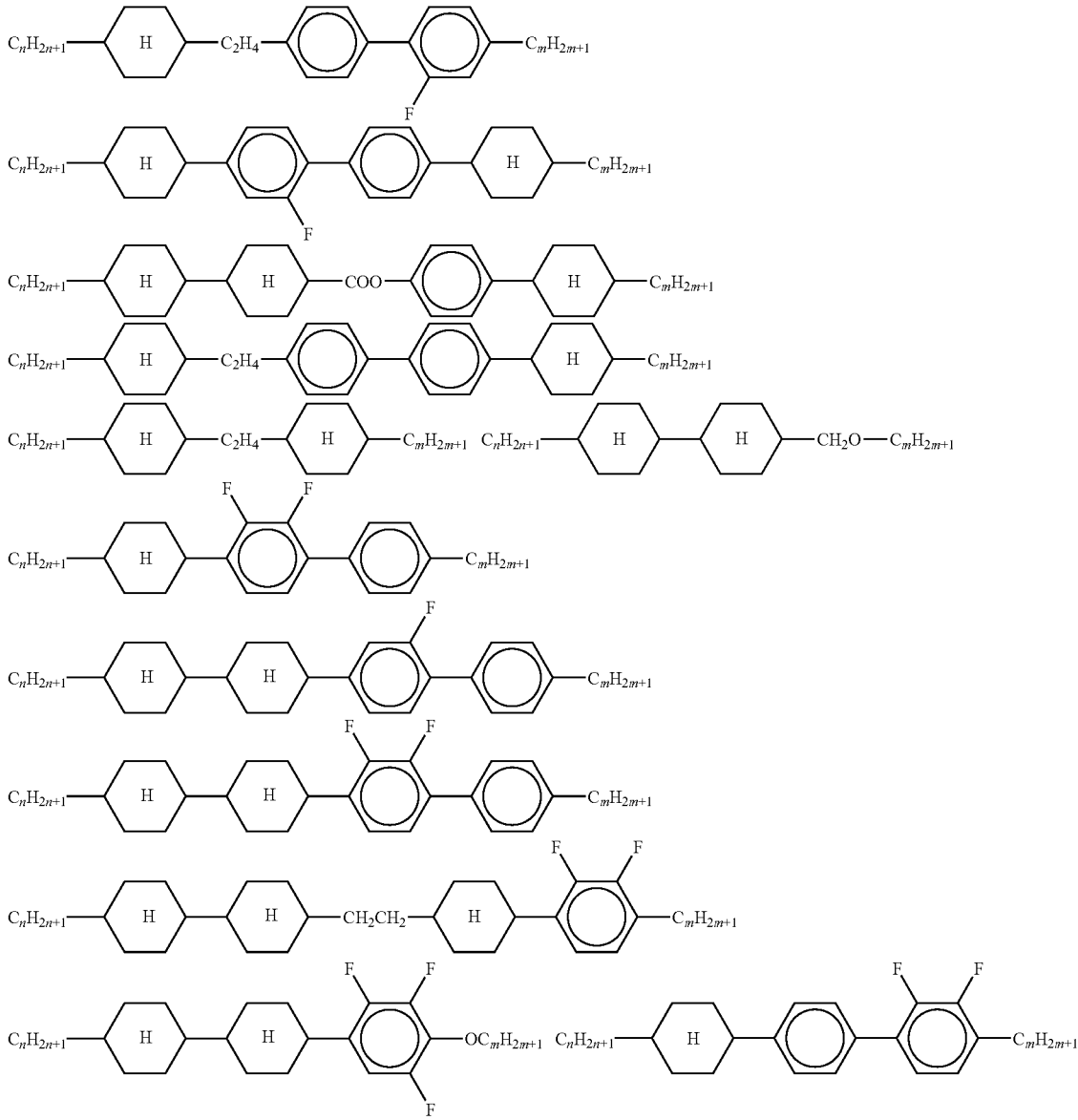

where m and n, independently of one another, denote 1, 2, 3, 4, 5, 6, 7 or 8.

The media according to the invention are prepared in a manner conventional per se. In general, the components are dissolved in one another, preferably at elevated temperature. By means of suitable additives, the liquid-crystalline phases of the present invention can be modified in such a way that they can be used in all types of liquid-crystal display element that have been disclosed hitherto. Additives of this type are known to the person skilled in the art and are described in detail in the literature (H. Kelker/R. Hatz, Handbook of Liquid Crystals, Verlag Chemie, Weinheim, 1980). For example, pleochroic dyes can be added for the production of coloured guest-host systems or substances can be added in order to modify the dielectric anisotropy, the viscosity and/or the alignment of the nematic phases.

Owing to their negative $\Delta\epsilon$, the compounds of the formula I are particularly suitable for use in VA-TFT displays.

The present invention therefore also relates to electro-optical liquid-crystal display elements containing a liquid-crystalline medium according to the invention.

Further combinations of the embodiments and variants of the invention arise from the claims.

The invention is explained in greater detail in the example part with reference to working examples, but without being intended to be restricted thereby.

Above and below, $\Delta n$ denotes the optical anisotropy (589 nm, 20° C.) and $\Delta\epsilon$ denotes the dielectric anisotropy (1 kHz, 20° C.).

In connection with the present invention, halogen denotes fluorine, chlorine, bromine or iodine.

In connection with the present invention, the term "alkyl"—unless defined otherwise elsewhere in this description or in the claims—in its most general meaning denotes a straight-chain or branched, saturated or unsaturated aliphatic hydrocarbon radical having 1 to 15 (i.e. 1, 2, 3, 4, 5, 6, 7, 8, 9, 10, 11, 12, 13, 14 or 15) carbon atoms; this radical is unsubstituted or mono- or polysubstituted by fluorine, chlorine, bromine, iodine, carboxyl, nitro, —$NH_2$, —N(alkanyl)$_2$ and/or cyano, where the multiple substitution can take place by identical or different substituents. The alkyl radical in the aliphatic hydrocarbon chain may also itself be functionalized.

If this alkyl radical is a saturated radical, it is also referred to as "alkanyl". Furthermore, the term "alkyl" also encompasses hydrocarbon radicals which are unsubstituted or correspondingly mono- or polysubstituted, identically or differently, by F and in which one or more $CH_2$ groups may be replaced by —O— ("alkoxy", "oxaalkyl"), —S— ("thioalkyl"), —$SO_2$—, —CH=CH— ("alkenyl"), —C≡C— ("alkynyl"), —CO—, —CO—O— or —O—CO— in such a way that heteroatoms (O and S) in the chain are not linked directly to one another. Alkyl is preferably a straight-chain or branched, unsubstituted or substituted alkanyl, alkenyl or alkoxy radical having 1, 2, 3, 4, 5, 6, 7 or 8 carbon atoms. If alkyl denotes an alkanyl radical, this is preferably methyl, ethyl, n-propyl, i-propyl, n-butyl, i-butyl, t-butyl, n-pentyl, neopentyl, n-hexyl, n-heptyl or n-octyl.

Since one or more $CH_2$ groups in an alkyl radical may be replaced by —O—, the term "alkyl" also encompasses "alkoxy" or "oxaalkyl" radicals. Alkoxy is taken to mean an O-alkyl radical in which the oxygen atom is bonded directly to the group substituted by the alkoxy radical or to the substituted ring, and alkyl is as defined above; alkyl is preferably then alkanyl or alkenyl. Preferred alkoxy radicals are methoxy, ethoxy, propoxy, butoxy, pentoxy, hexoxy, heptoxy and octoxy, where each of these radicals may also be substituted, preferably by one or more fluorine atoms. Alkoxy is particularly preferably —$OCH_3$, —$OC_2H_5$, —O-n-$C_3H_7$ or —O-n-$C_4H_9$. In connection with the present invention, the term "oxaalkyl" denotes alkyl radicals in which at least one non-terminal $CH_2$ group has been replaced by —O— in such a way that there are no adjacent heteroatoms (O and S). Oxaalkyl preferably encompasses straight-chain radicals of the formula $C_aH_{2a+1}$—O—$(CH_2)_b$—, where a and b each, independently of one another, denote 1, 2, 3, 4, 5, 6, 7, 8, 9 or 10; a is particularly preferably an integer from 1 to 6, and b is 1 or 2.

If the alkyl radical, alkanyl radical, alkenyl radical or alkoxy radical is substituted by at least one halogen, this radical is preferably straight-chain. Halogen is preferably F. The resultant radicals also include perfluorinated radicals. In the case of monosubstitution, the fluorine substituent can be in any desired position, but is preferably in the ω-position.

If radicals or substituents of the compounds according to the invention or the compounds according to the invention themselves are in the form of optically active or stereoisomeric radicals, substituents or compounds since they have, for example, a centre of asymmetry, these are also encompassed by the present invention. It goes without saying here that the compounds of the general formula I according to the invention can be in isomerically pure form, for example as pure enantiomers, diastereomers, E- or Z-isomers, trans- or cis-isomers, or in the form of a mixture of a plurality of isomers in any desired ratio, for example as the racemate, E/Z-isomer mixture or as cis/trans-isomer mixture.

For protection of any functional groups or substituents present in the molecule which may be reactive against undesired reactions during the reaction according to the invention and/or prior or subsequent reaction and/or work-up steps, it is possible to employ protecting groups, which can be removed again when the reaction is complete. Methods for the use of suitable protecting groups are known to the person skilled in the art and are described, for example, in T. W. Green, P. G. M. Wuts: Protective Groups in Organic Synthesis, 3rd Ed., John Wiley & Sons (1999).

The following abbreviations are used above and below:
RT room temperature
THF tetrahydrofuran
MTB ether methyl tert-butyl ether
BuLi n-butyllithium
DEAD diisopropyl azodicarboxylate
cl.p. clearing point

EXAMPLES

The starting substances can be obtained by generally accessible literature procedures or commercially. The reaction types described are in principle known from the literature. Besides the usual and well-known abbreviations, the following abbreviations are used:

C: crystalline phase; N: nematic phase; I: isotropic phase.

Temperature data are in degrees Celsius (° C.), unless indicated otherwise.

The physical, physicochemical and electro-optical parameters are determined by generally known methods, as described, inter alia, in the brochure "Merck Liquid Crystals—Licristal®—Physical Properties of Liquid Crystals—Description of the Measurement Methods", 1998, Merck KGaA, Darmstadt.

The dielectric anisotropy Δ∈ of the individual substances is determined at 20° C. and 1 kHz. To this end, 10% by weight of the substance to be investigated are measured dissolved in the dielectrically negative mixture ZLI-2857 (Merck KGaA), and the measurement value is extrapolated to a concentration of 100%. The optical anisotropy An is determined at 20° C. and a wavelength of 589.3 nm. Like the other measurement values, it is likewise determined by extrapolation of the values at 10% by weight in the dielectrically positive mixture ZLI-4792 (Merck KGaA).

Example 1.1

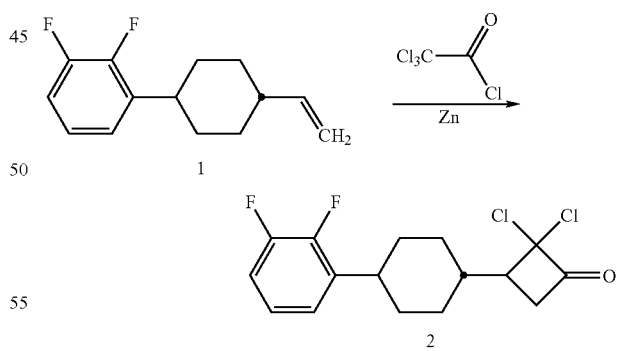

Zinc powder (40 g; 0.61 mmol) and copper(II) acetate monohydrate (2.50 g; 12.5 mmol) are added to a solution of the alkene (1) (79.0 g; 0.35 mmol) in 0.75 l of diethyl ether. 60 ml of trichloroacetyl chloride (0.53 mmol) are added dropwise over the course of 30 min., and stirring is continued until the exothermic reaction commences. After stirring for 8 h, the mixture is filtered through Celite®, and the solution is washed with water and saturated NaCl solution, dried over Na$_2$SO$_4$ and evaporated under reduced pressure. The brown residue is purified through a layer of silica gel using 1-chlorobutane. Yellow oil (2).

Example 1.2

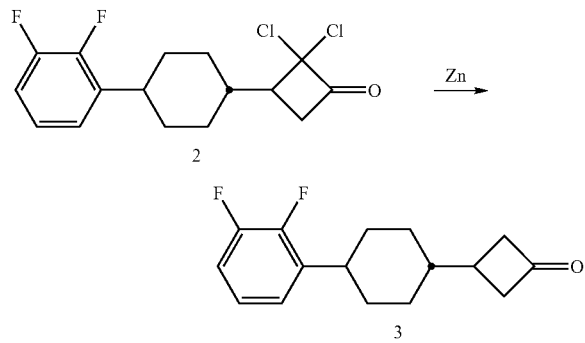

Zinc dust (100 g; 1.53 mol) is added with stirring to 111 g (0.308 mol) of the cyclobutanone (2) in 1 l of glacial acetic acid. After the exothermic reaction, the mixture is stirred at 70° C. for 12 h. Water and MTB ether are added to the batch, which is filtered through Celite® and rinsed with MTB ether. The aqueous phase is washed twice with MTB ether. The combined organic phases are washed with water, twice with saturated NaHCO$_3$ solution and with saturated NaCl solution and dried over Na$_2$SO$_4$.

Example 1.3

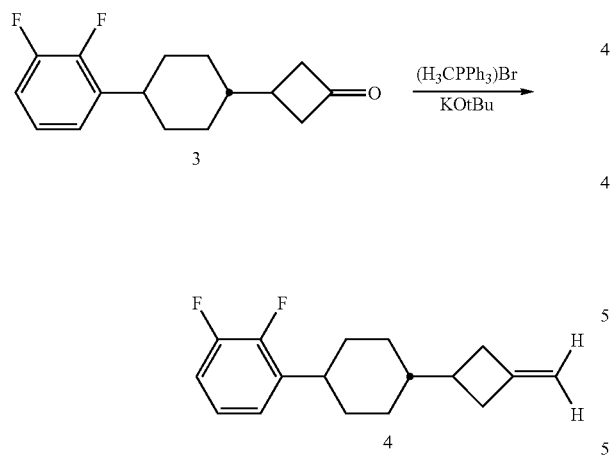

The cyclobutanone (3) (63.0 g; 237 mmol) and methyltriphenylphosphonium bromide are suspended in 500 ml of THF, and potassium tert-butoxide (30.0 g; 267 mmol) is added in portions at 10-20° C. The mixture is stirred for 12 h at RT, water is added, and the mixture is acidified using semi-concentrated HCl and extracted three times with MTB ether. The organic phase is washed with water and saturated NaCl solution, dried over Na$_2$SO$_4$ and evaporated under reduced pressure. The purification is carried out through silica gel. Clear liquid (4).

Example 1.4

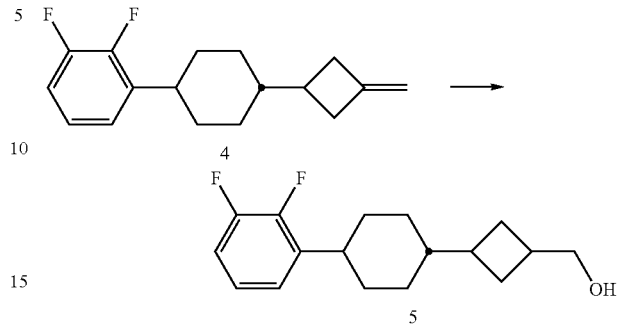

2,3-Dimethyl-2-butene (8.70 ml; 73.3 mol) is dissolved in 50 ml of dichloromethane, the solution is cooled to 0° C., and borane/dimethyl sulfide complex (1 N in CH$_2$Cl$_2$) (36.0 ml; 36.0 mmol) is added at this temperature. The alkene (4) (8.00 g; 30.1 mmol) in 50 ml of dichloromethane is added dropwise at 0° C., and the mixture is stirred for a further 12 h at RT. 1 N sodium hydroxide solution (170 ml; 170 mmol) and 35% hydrogen peroxide (17.0 ml; 174 mmol) are subsequently successively added dropwise. The suspension is stirred for 2 h at RT. Water and dichloromethane are added, and the phases are separated. The aqueous phase is extracted by shaking twice with methylene chloride, and the combined organic phases are washed twice with water and twice with ammonium iron(II) sulfate, dried over Na$_2$SO$_4$ and evaporated under reduced pressure. The clear oil is purified through silica gel using MTB ether. Colourless crystals (5).

Example 1.5

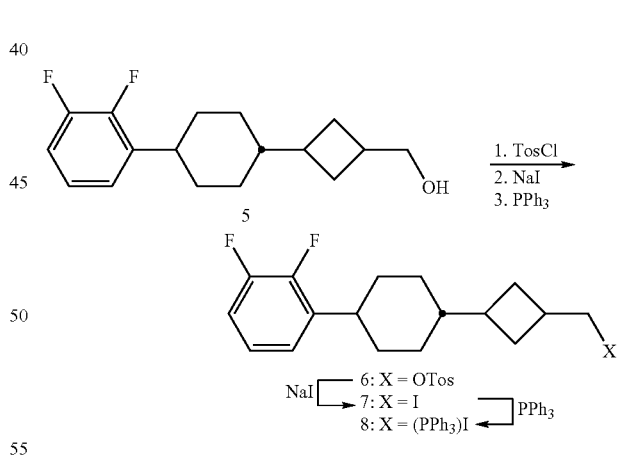

Toluene-4-sulfonyl chloride (9.00 g; 47.2 mmol) in 30 ml of dichloromethane is added dropwise at about 5° C. to the carbinol (5) (11.0 g; 39.2 mmol), 6.5 ml of pyridine (79.2 mmol) and 4-(dimethylamino)pyridine (5.00 g; 40.9 mmol) in 120 ml of dichloromethane. After stirring for 12 h at RT, water is added, the mixture is acidified using HCl, and the phases are separated. The aqueous phase is extracted by shaking three times with dichloromethane. The organic phases are washed with water, dried over Na$_2$SO$_4$ and evaporated under reduced pressure. The yellow oil is purified on silica gel using 1-chlorobutane and dichloromethane. Colourless crystals (6).

The tosyl ester (6) (14.5 g; 32.0 mmol), sodium iodide (10.0 g; 66.7 mmol) and 200 ml of acetone are refluxed for 12 h with stirring. Water, MTB ether and 5 ml of saturated NaHSO$_3$ solution are added to the batch. The aqueous phase is separated off and extracted by shaking with MTB ether. The organic phases are washed with water and saturated NaCl solution, dried over Na$_2$SO$_4$ and evaporated under reduced pressure. The purification is carried out on silica gel using heptane. Colourless crystals (7).

The iodide (7) (10.2 g; 25.9 mmol) and triphenylphosphine (8.00 g; 30.5 mmol) are heated at 120° C. for 12 h in 200 ml of butyronitrile. The solution is evaporated and recrystallized from MTB ether. Yellowish crystals (8).

Example 1.6

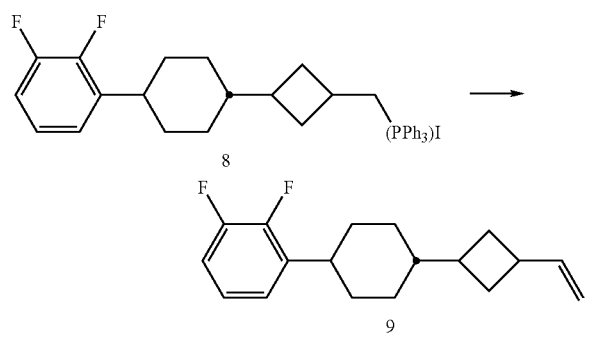

Potassium tert-butoxide (3.20 g; 28.5 mmol) in about 25 ml of THF is added dropwise at 0° C. to the triphenylphosphonium salt (8) (14.9 g; 22.8 mmol) in 50 ml of THF. After 15 min., paraformaldehyde (0.90 g; 28.4 mmol) is added at 0° C. The mixture is stirred for 1 h at RT. The water is added to the mixture, which is acidified using semi-concentrated HCl and extracted three times with MTB ether. The organic phases are washed with water and saturated NaCl solution and dried over Na$_2$SO$_4$. The filtrate is evaporated under reduced pressure and purified on silica gel using heptane. Yellowish crystals (9).

Example 1.7

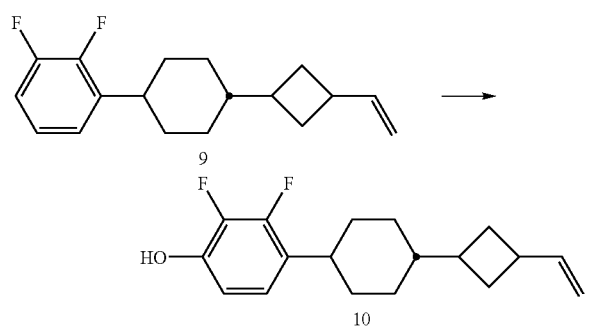

The difluorobenzene compound (9) (3.30 g; 11.8 mmol) is dissolved in 40 ml of dry THF and cooled to –70° C. n-BuLi (15% in hexane; 8.0 ml; 13 mmol) is added dropwise at this temperature, and the mixture is stirred for 30 min. A solution of trimethyl borate (1.50 ml; 13.4 mmol) in 10 ml of THF is slowly added at –70° C., and the mixture is stirred for a further 30 min. and slowly warmed to –15° C. A mixture of glacial acetic acid (1.0 ml; 17 mmol) and water (3.00 ml; 0.167 mol) is added dropwise, during which the temperature rises to 0° C. The mixture is warmed to 30° C., and 35% hydrogen peroxide (3.00 ml; 34.8 mmol) is slowly added dropwise at such a rate that the temperature does not exceed 40° C. After 1 h at 40° C., the mixture is stirred for 17 h at RT. The batch is brought into equilibrium with water and MTB ether, separated and again extracted with MTB ether. The extracts are washed with water, three times with ammonium iron(II) sulfate solution and with saturated NaCl solution. The evaporated residue is purified through silica gel using dichloromethane. Colourless crystals (10).

Example 1.8

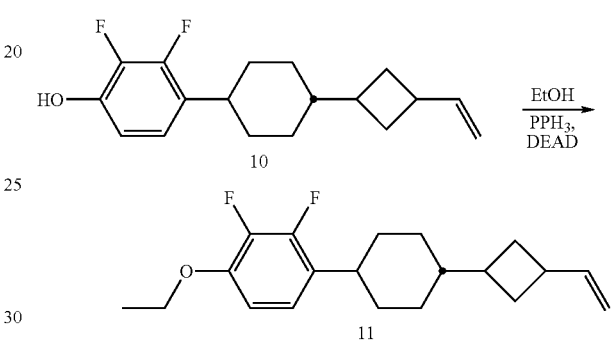

Diisopropyl azodicarboxylate (1.70 ml; 8.74 mmol) is added dropwise at RT to a solution of the phenol (10) (2.20 g; 7.52 mmol), triphenylphosphine (2.30 g; 8.76 mmol) and ethanol (0.50 ml; 8.57 mmol) in 50 ml of THF. The mixture is stirred for 12 h, freed from solvent under reduced pressure and purified on silica gel and by recrystallization from methanol. m.p. 59° C.

C 53 N (30) I; cl.p. 28° C.; Δε –5.8; Δn 0.086; γ$_1$ 165 mPa·s.

Example 1.9

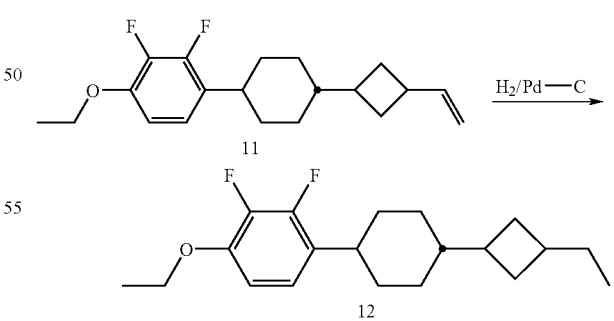

The alkene (11) (580 mg; 1.81 mmol) is hydrogenated for 22 h at RT under a hydrogen atmosphere together with palladium on carbon (5%; 0.60 g) in 10 ml of THF. The reaction mixture is filtered, evaporated under reduced pressure, filtered through silica gel using 1-chlorobutane and recrystallized from methanol. m.p. 56° C.

C 56 N (31) I; cl.p. 28° C.; Δε −5.5; Δn 0.068; γ₁ 167 mPa·s.

Example 2.1

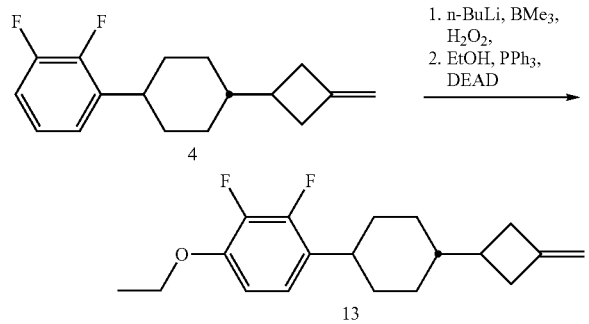
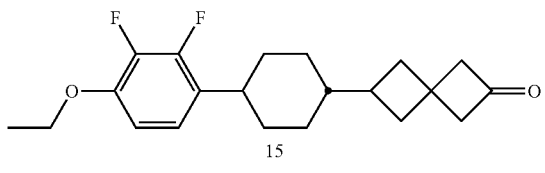

The ethyl ether compound (13) is prepared from the difluorobenzene (4) (14.3 g; 51.9 mmol) analogously to Example 1.7 by introduction of the OH group and analogously to Example 1.8 by etherification using ethanol, PPh₃ and DEAD. The yellow oil is purified by chromatography. Colourless crystals (13). m.p. 62° C.

C 62 N (21) I; cl.p. 10° C.; Δε −6.0; Δn 0.095; γ₁ 144 mPa·s.

Example 2.2

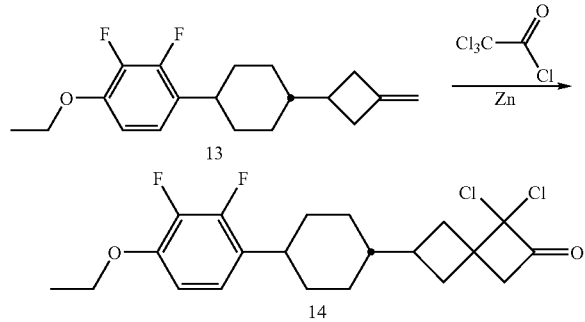

The cyclobutylene (13) (10.4 g; 33.9 mmol) is mixed with zinc powder (4.50 g; 68.8 mmol) and copper(II) acetate (0.40 g; 2.00 mmol) in 100 ml of diethyl ether. trichloroacetyl chloride (7.70 ml; 68.6 mmol) is added dropwise with stirring. When the exothermic reaction under reflux has subsided, the mixture is stirred for 12 h at RT. Work-up is carried out as for Example 1.1. For purification, the red-black oil is passed through silica gel with dichloromethane. Yellow oil (14).

Example 2.3

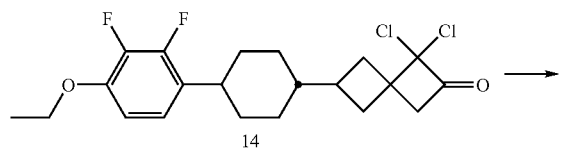

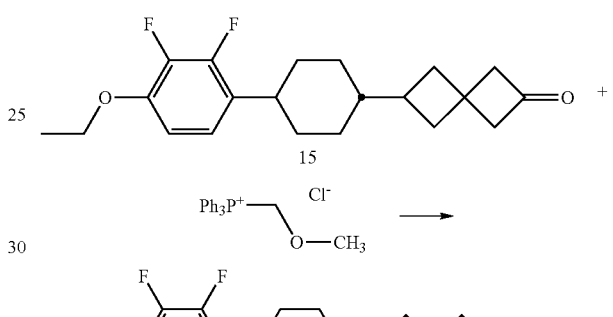

The dichlorocyclobutanone (13.7 g; 26.4 mmol) is reduced using zinc dust (13.0 g; 0.19 mol) in 150 ml of glacial acetic acid analogously to Example 1.2. The crude product in the form of yellow crystals is eluted through silica gel using 1 l of dichloromethane. Colourless crystals (15).

Example 2.4

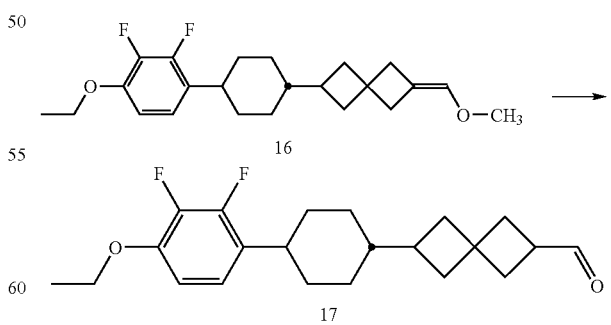

The spiro[3.3]heptanone (15) is suspended in 50 ml of dry THF, and potassium tert-butoxide (2.60 g; 23.1 mmol) in 50 ml of THF is added dropwise at 5° C. The reaction mixture is stirred for 12 h at RT and worked up as in the Wittig reaction from Example 1.3. The purification is carried out through silica gel using dichloromethane. Colourless crystals (16).

Example 2.5

The enol ether (16) (3.80 g; 10.0 mol) is stirred vigorously for 12 h at RT together with formic acid (10.0 ml; 0.26 mol) in 100 ml of toluene. The phases are separated; the aqueous phase is extracted twice with toluene. The combined organic phases are washed with water and saturated NaCl solution, dried over $Na_2SO_4$ and evaporated under reduced pressure. Yellow oil (17).

Example 2.6

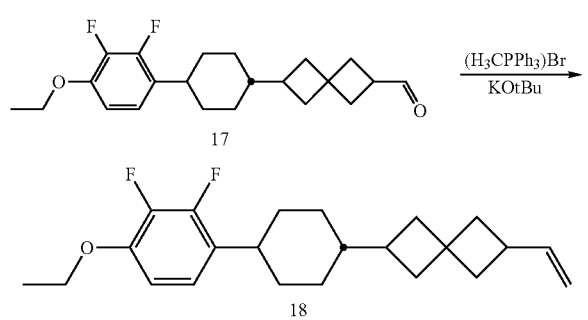

The spiro[3.3]heptanaldehyde (17) (3.80 g; 10.4 mmol) dissolved in 50 ml of THF is added dropwise at 0-5° C. to a reaction mixture prepared from methyltriphenylphosphonium bromide (5.00 g; 13.9 mmol) suspended in 30 ml of THF by slow addition of potassium tert-butoxide (1.60 g; 14.2 mmol) in 20 ml of THF. After the addition, the cooling bath is removed, and the mixture is stirred at RT for 1 h. The reaction mixture is worked up analogously to Example 1.3. The crude product comprising yellow crystals is purified through silica gel using 1-chlorobutane and recrystallized from ethanol. Colourless crystals (18). m.p. 87° C.

C 87 SmB (24) N 107 I; cl.p. 103° C.; $\Delta\epsilon$ −6.1; $\Delta n$ 0.103; $\gamma_1$ 305 mPa·s.

Example 2.7

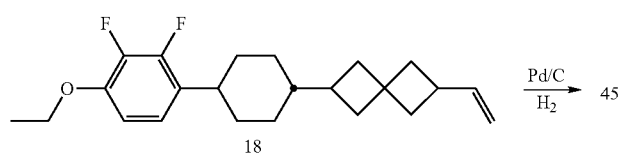

The alkene (18) (1.50 g; 4.12 mmol) is hydrogenated for 27 h using palladium on carbon (5%; 0.50 g) in 60 ml of THF at RT under a hydrogen atmosphere. After filtration through silica gel using dichloromethane, the product is purified by recrystallization from ethanol at −20° C. Colourless crystals (19). m.p. 67° C.

C 67 SmB (59) N 103 I; cl.p. 101° C.; $\Delta\epsilon$ −5.8; $\Delta n$ 0.093; $\gamma_1$ 271 mPa·s.

Example 3.1

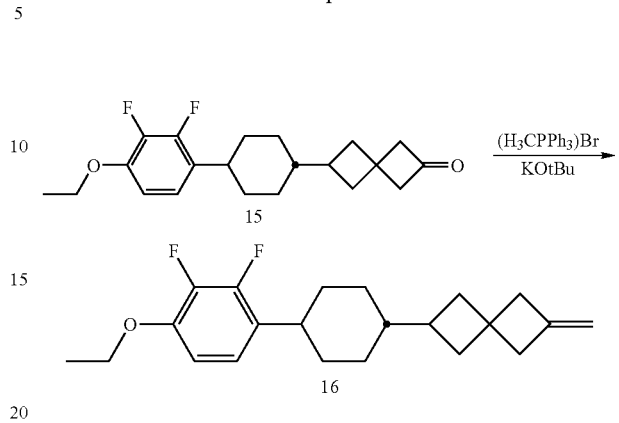

The alkene (16) is prepared analogously to Example 2.6 from the ketone (15) (1.40 g; 3.92 mmol), methyltriphenylphosphonium bromide (2.10 g; 5.87 mmol) and potassium tert-butoxide (0.65 g; 5.89 mmol). The yellow oil is purified in the same way. Colourless crystals (16). m.p. 85° C.

C 85 N (66) I; cl.p. 60° C.; $\Delta\epsilon$ −5.5; $\Delta n$ 0.095.

Example 3.2

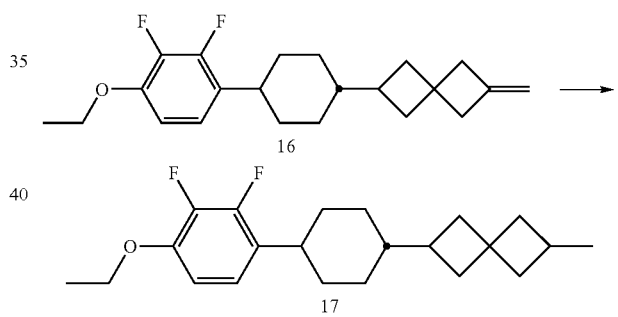

The alkene (16) (13.7 g; 26.4 mmol) is hydrogenated and purified analogously to Example 2.7. Colourless crystals (17). m.p. 75° C.

C 75 N 83 I; cl.p. 81° C.; $\Delta\epsilon$ −5.8; $\Delta n$ 0.089; $\gamma_1$ 232 mPa·s.

Example 4.1

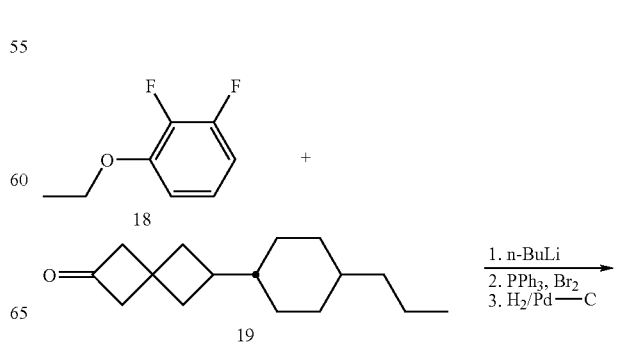

-continued

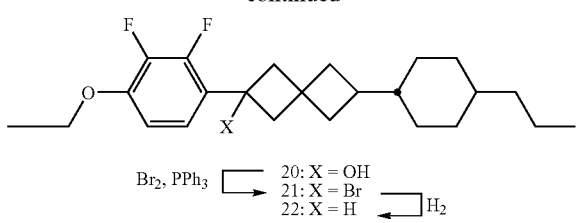

n-BuLi in hexane (15%; 18.2 ml; 29.9 mmol) is added to the ethoxydifluorobenzene (18) (4.73 g; 29.9 mmol) in 10 ml of dry THF, dissolved at −70° C., at such a rate that the temperature does not rise above −65° C. After the mixture has been stirred for 1 h, the ketone (7.00 g; 29.8 mmol) in 20 ml of THF is slowly added dropwise (<−65° C.). The cooling bath is removed, and the mixture is stirred for 12 h at RT. The batch is hydrolyzed using water and adjusted to pH 5-7 using concentrated hydrochloric acid, and the organic phase is separated off. Drying and evaporation gives the crude product, which is purified by chromatography on silica gel using dichloromethane.

Reaction of (20) to Give (21):

Bromine (1.45 ml; 28 mmol) is added dropwise over the course of 5 min. at 0-5° C. to a solution of triphenylphosphine (7.43 g; 28.0 mmol) in 40 ml of acetonitrile, the mixture is stirred for 1 h at 0° C., and the alcohol (18) (11.0 g; 28.0 mmol) is added. After the mixture has been stirred for 24 h at RT, the solvent is removed under reduced pressure, the product is taken up in heptane (200 ml), and the solution is stirred vigorously for 30 min. The solution is filtered, and the residue is rinsed with heptane. Removal of the solvent under reduced pressure gives the crude product (21), which is purified by chromatography on silica gel using pentane/1-chlorobutane.

Reaction of (21) to Give (22):

The bromide (21) (3.30 g; 7.24 mmol) in 20 ml of THF is reacted with triethylamine (1.5 g; 14.8 mol) and palladium on carbon (5%; 0.83 g) for 20 h at 60° C. under 5 bar of hydrogen. After filtration, the solvent is removed under reduced pressure. The product (22) is purified through silica gel using dichloromethane and crystallized using ethanol. Colourless crystals (22). m.p. 96° C.

C 96 SmB (93) N 131 I; cl.p. 138° C.; Δε −5.2; Δn 0.111; γ₁ 308 mPa·s.

Example 5

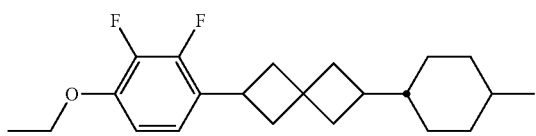

Compound (22a) is prepared analogously to Example 4.1.

Colourless crystals (23). m.p. 94° C.

C 94 N (79) I; cl.p. 78° C.; Δε −5.6; Δn 0.099; γ₁ 180 mPa·s.

Example 6

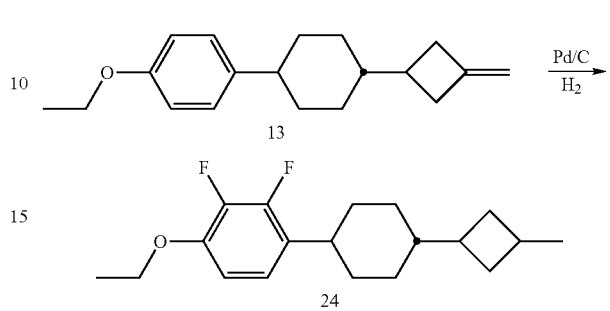

The methyl-substituted derivative (24) is prepared from (13), prepared in Example 2.1, analogously to the hydrogenation in Example 1.9 by hydrogenation of Pd/C for 22 h at RT.

C 53 I; cl.p. 12° C.; Δε −5.6; Δn 0.069; γ₁ 142 mPa·s.

Example 7

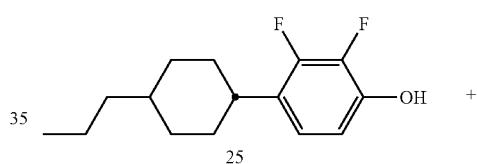

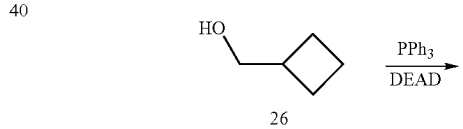

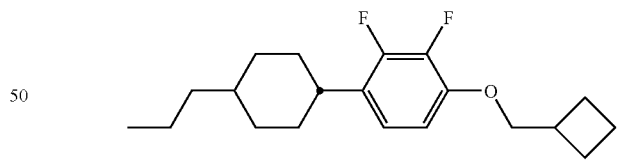

Diisopropyl azodicarboxylate (2.5 ml; 12.7 mmol) is added dropwise to a solution of the phenol (25) (3.00 g; 11.8 mmol), hydroxymethylcyclobutane (26) (1.20 ml; 12.8 mmol) and triphenylphosphine (3.40 g; 13.0 mmol) in 50 ml of THF. After the mixture has been stirred for a further 1 h, the solvent is stripped off under reduced pressure. The purification is carried out by filtration through silica gel using 1-chlorobutane and recrystallization by addition of ethanol and cooling to −20° C.

(27). m.p. 40° C.

C 40 I; cl.p. −48° C.; Δε −4.9; Δn 0.043; γ₁ 205 mPa·s.

The invention claimed is:
1. A compound of formula I

$$R^1-[A^1-Z^1]_a-[A^2-Z^2]_b-\text{(2,3-difluorophenylene)}-[Z^3-A^3]_c-[Z^4-A^4]_d-R^2$$

in which, in each case independently of one another, identically or differently, $R^1$ is a group of the formula $$CH_2=\text{(cyclobutane-cyclobutane)}_m-$$

$R^2$ is hydrogen, an alkanyl, alkoxy, alkenyl or alkynyl having up to 15 carbon atoms which is unsubstituted or mono- or polysubstituted by F, in which one or more $CH_2$ groups are optionally replaced, independently of one another, by —O—, —S—, —SO$_2$—, —CO—, —(CO)O—, —O(CO)— or —O(CO)—O— in such a way that heteroatoms are not linked directly, or a group of the formula $$CH_2=\text{(cyclobutane-cyclobutane)}_m-$$

$A^1$, $A^2$, $A^3$ and $A^4$ denote 1,4-cyclohexylene, in which one or two $CH_2$ are optionally replaced by O, 1,4-phenylene, which may be unsubstituted or mono- or disubstituted by F, or a group of the formula $$-\text{(cyclobutane-cyclobutane)}_n-$$

$Z^1$, $Z^2$, $Z^3$ and $Z^4$ denote a single bond, —CF$_2$O—, —OCF$_2$—, —CH$_2$CH$_2$—, —CF$_2$CF$_2$—, —CF$_2$CH$_2$—, —CH$_2$CF$_2$—, —CHF—CHF—, —(CO)O—, —O(CO)—, —CH$_2$O—, —OCH$_2$—, —CF=CH—, —CH=CF—, —CF=CF—, —CH=CH— or —C≡C—, a, b, c and d denote 0, 1 or 2, and
n and m denote 0 or 1.

2. A compound of formula I $$R^1-[A^1-Z^1]_a-[A^2-Z^2]_b-\text{(2,3-difluorophenylene)}-[Z^3-A^3]_c-[Z^4-A^4]_d-R^2$$

in which, in each case independently of one another, identically or differently, $R^1$ and $R^2$ are hydrogen, an alkanyl, alkoxy, alkenyl or alkynyl having up to 15 carbon atoms which is unsubstituted or mono- or polysubstituted by F, in which one or more $CH_2$ groups are optionally replaced, independently of one another, by —O—, —S—, —SO$_2$—, —CO—, —(CO)O—, —O(CO)— or —O(CO)—O— in such a way that heteroatoms are not linked directly, or a group of the formula $$CH_2=\text{(cyclobutane-cyclobutane)}_m-$$

$A^1$, $A^2$, $A^3$ and $A^4$ denote 1,4-cyclohexylene, in which one or two $CH_2$ are optionally replaced by O, 1,4-phenylene, which may be unsubstituted or mono- or disubstituted by F, or a group of the formula $$-\text{(cyclobutane-cyclobutane)}_n-$$

$Z^1$, $Z^2$, $Z^3$ and $Z^4$ denote a single bond, —CH$_2$CH$_2$—, —CF$_2$CF$_2$—, —CF$_2$CH$_2$—, —CH$_2$CF$_2$—, —CHF—CHF—, —CH$_2$O—, —OCH$_2$—, —CF=CH—, —CH=CF—, —CF=CF—, —CH=CH— or —C≡C—, a, b, c and d denote 0, 1 or 2, wherein the sum of a+b+c+d is 1, 2 or 3,
n is 1, and
m is 0 or 1,
wherein at least one of $A^1$, $A^2$, $A^3$ and $A^4$ is a group of the formula $$-\text{(cyclobutane-cyclobutane)}_n-$$

3. A compound according to claim 1, wherein m and n are 1.

4. A compound according to claim 1, wherein m and n are 0.

5. A compound according to claim 1, wherein c and d are 0.

6. A compound according to claim 1, wherein $R^2$ denotes $C_{1-8}$-alkoxy or alkenyloxy.

7. A compound according to claim 1, wherein $Z^1$, $Z^2$, $Z^3$ and $Z^4$, independently of one another, denote a single bond, —CH$_2$O— or —OCH$_2$—.

8. A process for preparing a compound according to claim 1, comprising converting a terminal alkene at the double bond using trichloroacetyl chloride into a 2,2-dichlorocyclobutan-1-on-3-yl compound.

9. A liquid-crystalline medium having at least two liquid-crystalline compounds, which comprises at least one compound according claim 1.

10. An electro-optical display element containing a liquid-crystalline medium according to claim 9.

11. A compound according to claim 2, wherein c and d are 0.

12. A compound according to claim 2, wherein $R^2$ denotes $C_{1-8}$-alkoxy or alkenyloxy.

13. A compound according to claim 2, wherein $Z^1$, $Z^2$, $Z^3$ and $Z^4$, independently of one another, denote a single bond, —CH$_2$O— or —OCH$_2$—.

14. A compound of formula I

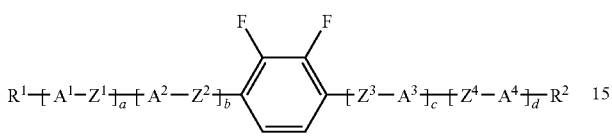

in which, in each case independently of one another, identically or differently, $R^1$ is hydrogen, an alkanyl, alkoxy, alkenyl or alkynyl having up to 15 carbon atoms which is unsubstituted or mono- or polysubstituted by F, in which one or more CH$_2$ groups are optionally replaced, independently of one another, by —O—, —S—, —SO$_2$—, —CO—, —(CO)O—, —O(CO)— or —O(CO)—O— in such a way that heteroatoms are not linked directly, or a group of the formula

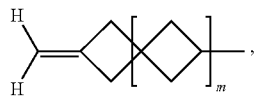

$R^2$ is $C_{1-8}$-alkoxy or alkenyloxy $A^1$, $A^2$, $A^3$ and $A^4$ denote 1,4-cyclohexylene, in which one or two CH$_2$ are optionally replaced by O, 1,4-phenylene, which may be unsubstituted or mono- or disubstituted by F, or a group of the formula

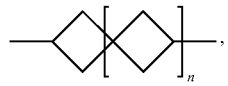

$Z^1$, $Z^2$, $Z^3$ and $Z^4$ denote a single bond, —CF$_2$O—, —OCF$_2$—, —CH$_2$CH$_2$—, —CF$_2$CF$_2$—, —CF$_2$CH$_2$—, —CH$_2$CF$_2$—, —CHF—CHF—, —(CO)O—, —O(CO)—, —CH$_2$O—, —OCH$_2$—, —CF=CH—, —CH=CF—, —CF=CF—, —CH=CH— or —C≡C—, a and b denote 0, 1 or 2, c and d denote 0, n is 0 or 1, and m is 0, wherein at least one group from $R^1$ and $R^2$ denotes a structural element of the formula

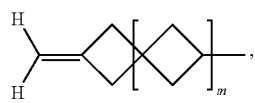

or at least one group from $A^1$, $A^2$, $A^3$ and $A^4$ denotes a structural element of the formula

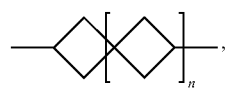

and wherein the total number of rings from $R^1$, $R^2$, $A^1$, $A^2$, $A^3$ and $A^4$ is 2, wherein each spiro[3.3]heptane group counts as one ring.

15. A compound according to claim 14, wherein n is 1.

16. A compound according to claim 14, wherein n is 0.

17. A compound according to claim 14, wherein $Z^1$, $Z^2$, $Z^3$ and $Z^4$, independently of one another, denote a single bond, —CH$_2$O— or —OCH$_2$—.

18. A liquid-crystalline medium having at least two liquid-crystalline compounds, which comprises at least one compound according claim 2.

19. A liquid-crystalline medium having at least two liquid-crystalline compounds, which comprises at least one compound according claim 14.

* * * * *